United States Patent [19]

Cannon et al.

[11] 4,020,401
[45] Apr. 26, 1977

[54] ELECTROLYTIC CAPACITOR HAVING A SILVER PLATED NICKEL CASE

[75] Inventors: Henry T. Cannon, Newberry; Charlie Edwin Taylor, Gilbert, both of S.C.

[73] Assignee: General Electric Company, Hudson Falls, N.Y.

[22] Filed: Dec. 19, 1975

[21] Appl. No.: 642,375

[52] U.S. Cl. .............................. 361/433; 361/305; 29/570; 174/50.5; 174/52 S
[51] Int. Cl.² .................... H01G 9/00; B01J 17/00; H01G 9/16; H01J 5/00
[58] Field of Search ............ 317/230, 242; 29/570; 174/50.5, 52

[56] References Cited
UNITED STATES PATENTS

| 2,923,866 | 2/1960 | Wagner | 317/230 |
| 3,515,950 | 6/1970 | Koons et al. | 317/230 |
| 3,531,693 | 9/1970 | Buice | 317/230 |
| 3,628,103 | 12/1971 | Booe | 317/230 |
| 3,697,823 | 10/1970 | Correll | 317/230 |
| 3,845,364 | 10/1974 | Shoot | 317/230 |

Primary Examiner—Andrew J. James
Attorney, Agent, or Firm—James J. Lichiello

[57] ABSTRACT

Disclosed is a porous anode electrolytic capacitor and casing therefor. The casing is made of nickel and has a contoured inner surface with a thin layer of silver plating thereon which follows the contour thereof. Adhered to the silver plating is a porous layer of particles of a platinum group metal which enhances the cathode surface area of the capacitor. Also disclosed is a timing capacitor including the casing. The capacitor is useful at temperatures up to 125° C.

10 Claims, 2 Drawing Figures

ELECTROLYTIC CAPACITOR HAVING A SILVER PLATED NICKEL CASE

BACKGROUND OF THE INVENTION

The present invention relates to electrolytic capacitors and, more particularly, to low cost porous anode capacitors having improved first charge properties and cathode area enhancement.

Liquid or gel electrolyte porous anode type capacitors require cathodes of very high capacitance density (microfarads per square inch). This is necessary because the effective anode area is very large and because the total capacitance of the device is dependent upon both anode capacitance or area and cathode capacitance or area. The very large effective area of the anode structure is realized by sintering very fine particles of valve metals to form a porous body. To obtain best utilization of the effective anode area, it is desirable to provide a cathode of greatly expanded surface area. As cathode area or capacitance becomes increasingly larger and approaches a theoretically infinite value, the total unit capacitance approaches the capacitance of the anode.

Increased effective cathode surface area (cathode enhancement) may be achieved by depositing a conductive layer of particles on the inner surface of the capacitor cathode casing. In currently commercially available porous anode capacitors, the cathode-enhancement material usually employed is platinum, palladium or rhodium. Typically, these metals are deposited on silver or silver alloy casings as known in the art with reasonably good results. It has been found, however, that platinum, palladium, and rhodium yield unsatisfactory results when deposited upon other cathode metals such as nickel and titanium. In particular, it has been found that the deposited layers lacked the tenacity required to withstand substantial vibration during operation and that capacitors employing these cathodes exhibited relatively inferior electrical properties.

It was taught in U.S. Pat. No. 3,531,693, issued to Buice on Sept. 29, 1970, and assigned to the present assigneee, that particles of ruthenium can effectively be used to enhance the cathode surface areas of capacitors with nickel casings. The capacitor taught by Buice was inexpensive due to its replacement of the expensive silver cathode casing with a casing of nickel. Furthermore, the capacitor works well in many applications. However, the capacitor taught by Buice has not found wide acceptance as a timing capacitor due to its first charge characteristic. That is, after the capacitor has remained idle for a period of time, a somewhat longer than normal period of time is required to recharge the capacitor. This effect is particularly noticeable at temperatures exceeding 85° C. Consequently, timers employing the capacitor can suffer from some inaccuracy if they are used only sporadically.

It is, therefore, an object of this invention to provide a capacitor that is relatively inexpensive but which exhibits good first charge characteristics, thus permitting its use as an inexpensive timing capacitor.

SUMMARY OF THE INVENTION

This invention is characterized by a porous anode electrolytic capacitor and a casing therefor. The casing includes a generally sleeve or cup-shaped nickel member having at least one open end and a contoured or roughened inner surface. The contour on the inner surface defines irregularities with a depth of about one to two mils and is preferably formed by techniques such as etching. A layer of thin silver plating on the interior surface substantially follows the contour thereon. The plating is very thin, typically about one mil or less in thickness. A porous layer of particles of a platinum group metal, such as ruthenium, overlies and is bonded to the silver plating. The roughness of the interior surface acts to enhance the adhesion of the particles to the silver plating and thus to the casing.

A capacitor is formed with the subject casing by disposing in the casing an anode composed of a film-forming metal and filling the casing with an electrolyte. Finally, a seal is put in place to prevent loss of the electrolyte. Typically, the anode is a sintered pellet of tantalum powder. The capacitor just described has been found to work well as a timing capacitor at temperatures up to 125° C. All the details of how the thin coating of the thin silver plating on the interior surface of the casing improves capacitor performance are not precisely clear.

As will become apparent below, many modifications of the present invention will readily suggest themselves. For example, the electrolyte can be an aqueous solution of the chloride of a metal selected from the group consisting of lithium, sodium, and calcium. Furthermore, the electrolyte can be non-gelled, or it can be gelled by the addition of fine particles of silica.

DESCRIPTION OF THE DRAWINGS

The invention will be better understood from the following description taken in conjunction with the accompanying drawings wherein.

DESCRIPTION OF THE PREFERRED EMBODIMENTS

Figure 1:
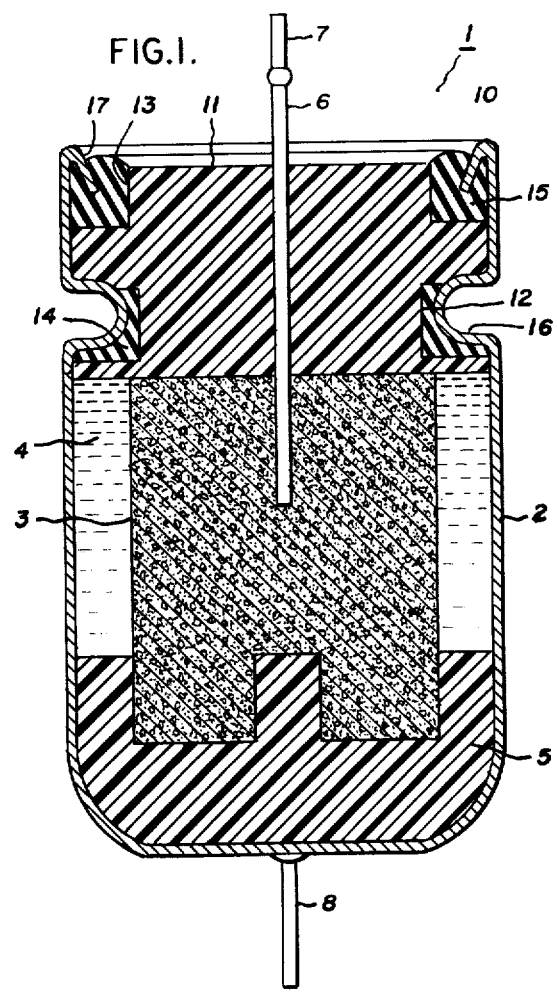
FIG. 1 illustrates a liquid or gel electrolyte porous anode capacitor to which the present invention is applicable.

Referring now to FIG. 1, there is shown an electrolytic capacitor 1 comprising a cup-shaped casing 2 containing a sintered pellet anode 3 inserted therein, the casing serving as the cathode and having a cathode terminal lead 8 secured thereto. The casing 2 is made of nickel or a high nickel alloy. The inner surface of the casing 2 is treated in accordance with the present invention to provide enhancement of the cathode area. The porous sintered anode 3 can be any of the well-known valve metals such as aluminum, zirconium, niobium, tantalum, etc., selected in accordance with the particular application for which it is desired, the electrolyte which is used, and commercial cost considerations. Tantalum is the preferred anode material for most applications. The anode has an oxide dielectric film (not shown) formed over all surfaces thereof as is well known in the art. Anode 3 is immersed in a liquid or gel electrolyte 4 contained in casing 2. The electrolyte is preferably lithium, sodium or calcium chloride. It is most preferably lithium chloride and it can be gelled by the addition of fine silica particles, if desired.

In an exemplary construction, casing 2 is a cup-shaped form having a single open end 10 which is hermetically sealed. Within casing 2, there is positioned a bottom spacer 5 which is made of a chemically resistant insulating material having low moisture absorbent characteristics, such as polytetrafluoroethylene (Teflon). Passing through the open end 10 and extending outwardly of casing 2 is anode terminal lead wire 6. Lead wire 6, which is typically composed of tantalum or other equivalent film-forming or valve metal having similar thermal expansion properties, is secured at its inner end to anode 3. At its outer end, terminal lead 6 is welded or otherwise joined to an external lead 7, usually composed of a solderable metal such as nickel, nickel alloy or the like.

Casing 2 is preferably closed at its open end 10 by a seal structure which provides a strong, hermetic seal, is compatible with electrolyte 4 and effectively prevents its escape from within casing 2 even under severe operating conditions of widely varying temperature and pressure. A seal preferred for use on capacitors embodying the present invention is fully disclosed in U.S. Pat. No. 3,502,948, Crouch et al, assigned to the same assignee as the present invention. Briefly, the seal structure comprises a combined plug seal 11 in the open end 10. Anode lead 6 projects through plug 11 so that anode 3 is fixedly positioned in casing 2. Plug seal 11 is a non-conducting material also compatible with the electrolyte, and further compatible with hte metal of the case 2 for seal purposes. The material for plug member 11 is usually a thermoplastic material, with Teflon providing a number of advantages for its use.

The use of separate O-ring seals, in combination with a Teflon material plug 11, further improves operation of a Teflon plug sealed capacitor over extended operating ranges between about −55° C to about 125° C. For example, a pair of O-rings which are concentric with the longitudinal axis of the capacitor and are axially spaced apart along the length of plug 11 can be used.

More particularly, for example, Teflon plug 11 includes a pair of performed grooves 12 and 13 therein. Groove 12 is generally centrally located with respect to plug 11, or at least having the bottom and both side walls defined by the plug. In this groove 12 there is positioned a first O-ring 14 made of a material compatible with the electrolyte and silver. O-ring 14 may include Kel-F material, ethylene propylene rubber and other suitable O-ring gasket materials.

The upper surface of plug 11 includes a peripheral annular cutout or shoulder type of groove 13 which there is positioned a second O-ring 15 of a material similar to that of O-ring 14. In assembly of the capacitor 1, plug 11 is inserted within casing 2 with the noted O-rings 14 and 15 in the positions illustrated. thereafter casing 2 is rolled to provide the indentation or peripheral casing groove 16 which engages and compresses O-ring 14 to provide a seal between the O-ring and the casing and between the O-ring and plug 11. Thereafter, the open end of the casing 10 is rolled over or crimped so that an in-turned lip portion 17 thereof engages the upper O-ring 15 for compression and sealing between the casing and the O-ring and between the O-ring and the plug 11. Accordingly, the O-rings 14 and 15 provide separate seals but are retained within the same plug 11, and are cooperative with the same coextensive casing wall.

Figure 2:
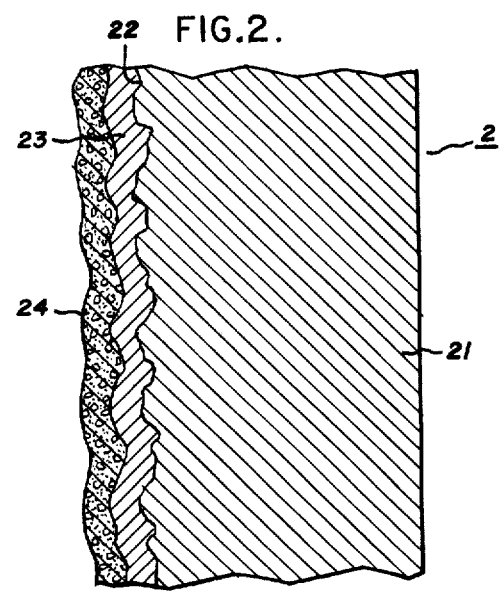
FIG. 2 is a detail view of part of the casing of the capacitor of FIG. 1.

Referring now to FIG. 2, there is shown a detailed sectional view of a portion of the casing 2. The cup-shaped member comprises a region of nickel or high nickel alloy 21 with the interior surface 22 thereof suitably contoured or roughened. The contouring can be by any conventional method, such as chemical or electro-chemical etching, by mechanical methods such as abrading or forming. What is desired is an active cathode area having myriads of peaks, valleys, cavities and interestices coextensive with the surface. Ordinarily, the maximum distance from a highest peak to a lowest valley would be about 1 to 2 mils. A thin layer of silver plating 23 overlies the interior surface 22 of the casing. Any conventional technique, such as electroplating can be used to apply the silver. The silver layer is typically no more than one mil thick and substantially follows the contour on the surface 22.

Overlying the silver layer is a spongy layer 24 of particles of a platinum group metal such as ruthenium. The individual particles of the platinum group metal are very small, for example in the range of microns, and thus are not shown individually in FIG. 2. The spongy layer 24 is applied by any conventional technique known in the capacitor art. Exemplary techniques include electroplating or chemical plating. The spongy layer 24 is made as thick as necessary to obtain the desired cathode capacitance as is well known in the capacitor art.

In this invention it has been found that the silver plating effectively masks any adverse effects of the casing material and is compatible therewith in the capacitor environment. The silver can easily be plated on the nickel surface without filling up the irregularities and otherwise greatly detracting form the increased surface area obtained through contouring.

It has been found that a capacitor constructed in accordance with the teaching herein exhibits excellent first charge characteristics. Yet, the capacitor is low in cost due to the utilization of a greater amount of nickel or nickel alloy casing and only a small amount of silver. Furthermore, electrical characteristics of the capacitor remain stable up to 125° C.

In view of the above teachings, many modifications and variations of the present invention will be apparent to those skilled in the art. For example, a coiled wire anode could be used. It is to be understood, therefore, that the invention can be practiced otherwise than as specifically described.

What is claimed is:

1. A cathode casing for an electrolytic capacitor, said casing comprising:
    an outer generally cup-shaped nickel bearing casing member having at least one open end and having a contoured interior surface;
    a layer of thin silver plating adhering to said interior surface, said plating substantially following the contour of said interior surface; and
    a porous layer of particles of a platinum group metal overlying and bonded to said silver plating, the contour of said interior surface acting to enhance the adhesion of said particles to said silver plating.

2. A casing according to claim 1 wherein said platinum group metal is ruthenium.

3. A casing according to claim 2 wherein the contour of said interior surface defines surface irregularities of less than about one mil in depth and said silver plating is less than about two mils in thickness.

4. An electrolytic timing capacitor for use at temperatures up to 125° C comprising:
    a nickel bearing casing for containing electrolyte having at least one open end and a contoured interior surface and also having cathode lead means coupled thereto;

a layer of thin silver plating on the interior surface of said casing, said layer substantially following the contour of said interior surface;

a porous layer of particles of a platinum group metal overlying said silver plating, the contour of said interior surface acting to enhance the adhesion of the particles to said silver plating and to said interior surface;

an anode disposed within said casing and separated therefrom by an insulating support, said anode being composed of a film-forming metal and having anode lead means coupled thereto;

an electrolyte substantially filling said casing, said electrolyte comprising the chloride of a metal selected from the group consisting of lithium, sodium, and calcium; and seal means to seal said open end.

5. A capacitor according to claim 4 wherein said anode is a sintered pellet of tantalum powder.

6. A capacitor according to claim 4 wherein said electrolyte comprises lithium chloride.

7. A capacitor according to claim 6 wherein said electrolyte is non-gelled.

8. A capacitor according to claim 6 wherein said electrolyte comprises fine particles of silica for gelling said electrolyte.

9. A capacitor according to claim 4 wherein said platinum group metal is ruthenium.

10. A capacitor according to claim 4 wherein the contour of said interior surface defines surface irregularities of less than about 1 mil in depth and said silver plating is less than about 2 mils in thickness.

* * * * *